(12) United States Patent
Pabst et al.

(10) Patent No.: US 7,936,102 B2
(45) Date of Patent: May 3, 2011

(54) MAGNET HOLDER FOR PERMANENT MAGNET ROTORS OF ROTATING MACHINES

(75) Inventors: Otto Pabst, Rio Di Pusteria (IT); Franco Gadrino, Pianezza (IT)

(73) Assignee: Wilic S.AR.L, Luxembourg (LU)

( * ) Notice: Subject to any disclaimer, the term of this patent is extended or adjusted under 35 U.S.C. 154(b) by 262 days.

(21) Appl. No.: 12/095,302

(22) PCT Filed: Sep. 27, 2006

(86) PCT No.: PCT/IB2006/002684
§ 371 (c)(1), (2), (4) Date: Nov. 3, 2008

(87) PCT Pub. No.: WO2007/063370
PCT Pub. Date: Jun. 7, 2007

(65) Prior Publication Data
US 2009/0302702 A1    Dec. 10, 2009

(30) Foreign Application Priority Data

Nov. 29, 2005 (IT) .............................. BZ2005A0062

(51) Int. Cl.
*H02K 1/30* (2006.01)
*H02K 15/03* (2006.01)

(52) U.S. Cl. ......... 310/156.12; 310/156.08; 310/156.19; 310/216.082; 29/598

(58) Field of Classification Search ............. 310/156.08, 310/156.12–156.15, 156.18–156.19, 216.079, 310/216.081–216.083, 216.086, 216.087, 310/216.098
See application file for complete search history.

(56) References Cited

U.S. PATENT DOCUMENTS

| | | | |
|---|---|---|---|
| 596,152 A * | 12/1897 | Geisenhoener | ........ 310/216.088 |
| 1,894,357 A | 1/1933 | Manikowske | |
| 1,948,854 A | 2/1934 | Heath et al. | |
| 1,979,813 A | 11/1934 | Reis et al. | |
| 2,006,172 A | 6/1935 | Klappauf | |
| 2,040,218 A | 5/1936 | Soderberg | |

(Continued)

FOREIGN PATENT DOCUMENTS

CA    2 404 939    4/2004

(Continued)

OTHER PUBLICATIONS

International Preliminary Report on Patentability for corresponding foreign application (PCT/IB2006/002684), dated Jun. 3, 2008.

(Continued)

*Primary Examiner* — Burton Mullins
(74) *Attorney, Agent, or Firm* — K&L Gates LLP

(57) ABSTRACT

A rotating machine with a permanent magnet rotor that is easier, lower cost, and lighter includes a plurality of permanent magnet assemblies (20) mounted on a rotor body (1). The magnet assemblies (20) are mounted via magnet holders that each include a pair of claws (2, 3) connected by a bridge (5) and forming a seat for a respective magnet assembly (20). The claws have terminal expansions (11) that extend beyond the bridge (5) and form a second seat in which a tightening section (9) is received. The claws (2, 3) can elastically pivot about the bridge (5) when the terminal expansions (11) are squeezed together or forced apart, allowing insertion of and securing the magnet assembly, respectively.

15 Claims, 3 Drawing Sheets

U.S. PATENT DOCUMENTS

| | | | |
|---|---|---|---|
| 2,177,801 A | 10/1939 | Arnold | |
| 2,469,734 A | 5/1949 | Ledwith | |
| 2,496,897 A | 2/1950 | Strickland | |
| 2,655,611 A | 10/1953 | Sherman et al. | |
| 2,739,253 A | 3/1956 | Plumb et al. | |
| 2,756,356 A * | 7/1956 | Brownlee et al. | 310/153 |
| 2,806,160 A | 9/1957 | Brainard et al. | |
| 2,842,214 A | 7/1958 | Prewitt | |
| 2,903,610 A | 9/1959 | Bessiere | |
| 3,004,782 A | 10/1961 | Meermans | |
| 3,072,813 A | 1/1963 | Reijust et al. | |
| 3,083,311 A | 3/1963 | Krasnow et al. | |
| 3,131,942 A | 5/1964 | Ertaud | |
| 3,168,686 A | 2/1965 | King | |
| 3,221,195 A | 11/1965 | Hoffmann | |
| 3,363,910 A | 1/1968 | Toronchuk | |
| 3,364,523 A | 1/1968 | Schippers | |
| 3,392,910 A | 7/1968 | Tanzberger | |
| 3,468,548 A | 9/1969 | Webb | |
| 3,700,247 A | 10/1972 | Butler et al. | |
| 3,724,861 A | 4/1973 | Lesiecki | |
| 3,746,349 A | 7/1973 | Smale et al. | |
| 3,748,089 A | 7/1973 | Boyer | |
| 3,789,252 A | 1/1974 | Abegg | |
| 3,828,426 A * | 8/1974 | Phelon et al. | 29/598 |
| 3,841,643 A | 10/1974 | McLean | |
| 3,860,843 A | 1/1975 | Kawasaki et al. | |
| 3,942,026 A | 3/1976 | Carter | |
| 3,963,247 A | 6/1976 | Nommensen | |
| 3,968,969 A | 7/1976 | Mayer et al. | |
| 4,022,479 A | 5/1977 | Orlowski | |
| 4,061,926 A | 12/1977 | Peed | |
| 4,087,698 A | 5/1978 | Myers | |
| 4,141,137 A * | 2/1979 | De Wolf et al. | 29/596 |
| 4,179,634 A * | 12/1979 | Burson | 310/153 |
| 4,273,343 A | 6/1981 | Visser | |
| 4,289,970 A | 9/1981 | Deibert | |
| 4,291,235 A | 9/1981 | Bergey, Jr. | |
| 4,292,532 A | 9/1981 | Leroux | |
| 4,336,649 A | 6/1982 | Glaser | |
| 4,339,874 A | 7/1982 | McCarty | |
| 4,348,604 A | 9/1982 | Thode | |
| 4,350,897 A | 9/1982 | Benoit | |
| 4,354,126 A | 10/1982 | Yates | |
| 4,368,895 A | 1/1983 | Okamoto et al. | |
| 4,398,773 A | 8/1983 | Boden et al. | |
| 4,452,046 A | 6/1984 | Valentin | |
| 4,482,831 A * | 11/1984 | Notaras et al. | 310/156.59 |
| 4,490,093 A | 12/1984 | Chertok et al. | |
| 4,517,483 A | 5/1985 | Hucker | |
| 4,517,484 A | 5/1985 | Dacier | |
| 4,521,026 A | 6/1985 | Eide | |
| 4,585,950 A | 4/1986 | Lund | |
| 4,613,779 A | 9/1986 | Meyer | |
| 4,638,200 A | 1/1987 | Le Corre et al. | |
| 4,648,801 A | 3/1987 | Wilson | |
| 4,694,654 A | 9/1987 | Kawamura | |
| 4,700,096 A | 10/1987 | Epars | |
| 4,714,852 A | 12/1987 | Kawada | |
| 4,720,640 A | 1/1988 | Anderson | |
| 4,722,661 A | 2/1988 | Mizuno | |
| 4,724,348 A | 2/1988 | Stokes | |
| 4,761,590 A | 8/1988 | Kaszman | |
| 4,792,712 A | 12/1988 | Stokes | |
| 4,801,244 A | 1/1989 | Stahl | |
| 4,866,321 A | 9/1989 | Blanchard | |
| 4,900,965 A | 2/1990 | Fisher | |
| 4,906,060 A | 3/1990 | Claude | |
| 4,973,868 A | 11/1990 | Wust | |
| 4,976,587 A | 12/1990 | Johnston et al. | |
| 5,004,944 A | 4/1991 | Fisher | |
| 5,063,318 A | 11/1991 | Anderson | |
| 5,090,711 A | 2/1992 | Becker | |
| 5,091,668 A | 2/1992 | Cuenot et al. | |
| 5,177,388 A | 1/1993 | Hotta | |
| 5,191,255 A | 3/1993 | Kloosterhouse et al. | |
| 5,275,139 A | 1/1994 | Rosenquist | |
| 5,280,209 A | 1/1994 | Leupold et al. | |
| 5,281,094 A | 1/1994 | McCarty et al. | |
| 5,298,827 A | 3/1994 | Sugiyama | |
| 5,302,876 A | 4/1994 | Iwamatsu et al. | |
| 5,311,092 A | 5/1994 | Fisher | |
| 5,315,159 A | 5/1994 | Gribnau | |
| 5,331,238 A | 7/1994 | Johnsen | |
| 5,410,997 A | 5/1995 | Rosenquist | |
| 5,419,683 A | 5/1995 | Peace | |
| 5,456,579 A | 10/1995 | Olson | |
| 5,483,116 A | 1/1996 | Kusase | |
| 5,506,453 A | 4/1996 | McCombs | |
| 5,579,800 A | 12/1996 | Walker | |
| 5,609,184 A | 3/1997 | Apel et al. | |
| 5,663,600 A | 9/1997 | Baek et al. | |
| 5,670,838 A | 9/1997 | Everton | |
| 5,696,419 A | 12/1997 | Rakestraw | |
| 5,704,567 A | 1/1998 | Maglieri | |
| 5,746,576 A | 5/1998 | Bayly | |
| 5,777,952 A | 7/1998 | Nishimura | |
| 5,783,894 A | 7/1998 | Whither | |
| 5,793,144 A | 8/1998 | Kusase | |
| 5,798,632 A | 8/1998 | Muljadi | |
| 5,801,470 A | 9/1998 | Johnson et al. | |
| 5,811,908 A | 9/1998 | Iwata et al. | |
| 5,814,914 A | 9/1998 | Caamaño | |
| 5,844,333 A | 12/1998 | Sheerin | |
| 5,844,341 A | 12/1998 | Spooner | |
| 5,857,762 A | 1/1999 | Schwaller | |
| 5,886,441 A | 3/1999 | Uchida | |
| 5,889,346 A | 3/1999 | Uchida | |
| 5,894,183 A | 4/1999 | Borchert | |
| 5,925,964 A | 7/1999 | Kusase | |
| 5,952,755 A | 9/1999 | Lubas | |
| 5,961,124 A | 10/1999 | Muller | |
| 5,973,435 A | 10/1999 | Irie et al. | |
| 5,986,374 A | 11/1999 | Kawakami | |
| 5,986,378 A | 11/1999 | Caamaño | |
| 6,013,968 A | 1/2000 | Lechner et al. | |
| 6,037,692 A | 3/2000 | Miekka | |
| 6,064,123 A | 5/2000 | Gislason | |
| 6,067,227 A | 5/2000 | Katsui et al. | |
| 6,089,536 A | 7/2000 | Watanabe | |
| 6,093,984 A | 7/2000 | Shiga et al. | |
| 6,127,739 A | 10/2000 | Appa | |
| 6,172,429 B1 | 1/2001 | Russell | |
| 6,177,746 B1 | 1/2001 | Tupper | |
| 6,193,211 B1 | 2/2001 | Watanabe | |
| 6,194,799 B1 | 2/2001 | Miekka | |
| 6,215,199 B1 | 4/2001 | Lysenko et al. | |
| 6,232,673 B1 | 5/2001 | Schoo et al. | |
| 6,278,197 B1 | 8/2001 | Appa | |
| 6,285,090 B1 | 9/2001 | Brutsaert et al. | |
| 6,326,711 B1 | 12/2001 | Yamaguchi | |
| 6,365,994 B1 | 4/2002 | Watanabe | |
| 6,373,160 B1 | 4/2002 | Schrödl | |
| 6,376,956 B1 | 4/2002 | Hosoya | |
| 6,378,839 B2 | 4/2002 | Watanabe | |
| 6,384,504 B1 | 5/2002 | Elrhart et al. | |
| 6,417,578 B1 | 7/2002 | Chapman | |
| 6,428,011 B1 | 8/2002 | Oskouei | |
| 6,452,287 B1 | 9/2002 | Looker | |
| 6,452,301 B1 | 9/2002 | Van Dine et al. | |
| 6,455,976 B1 | 9/2002 | Nakano | |
| 6,472,784 B2 | 10/2002 | Miekka | |
| 6,474,653 B1 | 11/2002 | Hintenlang et al. | |
| 6,476,513 B1 | 11/2002 | Gueorguiev | |
| 6,483,199 B2 | 11/2002 | Umemoto et al. | |
| 6,492,743 B1 | 12/2002 | Appa | |
| 6,492,754 B1 | 12/2002 | Weiglhofer et al. | |
| 6,499,532 B1 | 12/2002 | Williams | |
| 6,504,260 B1 | 1/2003 | Debleser | |
| 6,515,390 B1 | 2/2003 | Lopatinsky et al. | |
| 6,520,737 B1 | 2/2003 | Fischer et al. | |
| 6,548,932 B1 | 4/2003 | Weiglhofer et al. | |
| 6,590,312 B1 | 7/2003 | Seguchi | |
| 6,603,232 B2 | 8/2003 | Van Dine et al. | |
| 6,617,747 B1 | 9/2003 | Petersen | |
| 6,629,358 B2 | 10/2003 | Setiabudi et al. | |
| 6,664,692 B1 | 12/2003 | Kristofferson | |

| | | | | | | |
|---|---|---|---|---|---|---|
| 6,676,122 B1 | 1/2004 | Wobben | | 7,687,932 B2 | 3/2010 | Casazza et al. |
| 6,683,397 B2 | 1/2004 | Gauthier et al. | | 2002/0047418 A1 | 4/2002 | Seguchi |
| 6,700,260 B2 | 3/2004 | Hsu | | 2002/0047425 A1 | 4/2002 | Coupart et al. |
| 6,700,288 B2 | 3/2004 | Smith | | 2002/0056822 A1 | 5/2002 | Watanabe |
| 6,707,224 B1 | 3/2004 | Petersen | | 2002/0063485 A1 | 5/2002 | Lee |
| 6,720,688 B1 | 4/2004 | Schiller | | 2002/0089251 A1 | 7/2002 | Tajima et al. |
| 6,727,624 B2 | 4/2004 | Morita et al. | | 2002/0148453 A1 | 10/2002 | Watanabe |
| 6,746,217 B2 | 6/2004 | Kim | | 2003/0011266 A1 | 1/2003 | Morita et al. |
| 6,759,758 B2 | 7/2004 | Martinez | | 2003/0102677 A1 | 6/2003 | Becker et al. |
| 6,762,525 B1 | 7/2004 | Maslov et al. | | 2003/0137149 A1 | 7/2003 | Northrup et al. |
| 6,781,276 B1 | 8/2004 | Stiesdal et al. | | 2003/0230899 A1 | 12/2003 | Martinez |
| 6,784,564 B1 | 8/2004 | Wobben | | 2004/0086373 A1 | 5/2004 | Page, Jr. |
| 6,794,781 B2 | 9/2004 | Razzell | | 2004/0094965 A1 | 5/2004 | Kirkegaard et al. |
| 6,828,710 B1 | 12/2004 | Gabrys | | 2004/0119292 A1 | 6/2004 | Darra |
| 6,856,042 B1 | 2/2005 | Kubota | | 2004/0150283 A1 | 8/2004 | Calfo |
| 6,879,075 B2 | 4/2005 | Calfo et al. | | 2004/0151575 A1 | 8/2004 | Pierce et al. |
| 6,888,262 B2 | 5/2005 | Blakemore | | 2004/0151577 A1 | 8/2004 | Pierce et al. |
| 6,891,299 B2 | 5/2005 | Coupart et al. | | 2004/0189136 A1 | 9/2004 | Kolomeitsev et al. |
| 6,903,466 B1 | 6/2005 | Mercier et al. | | 2005/0002783 A1 | 1/2005 | Hiel et al. |
| 6,903,475 B2 | 6/2005 | Ortt et al. | | 2005/0002787 A1 | 1/2005 | Wobben |
| 6,906,444 B2 | 6/2005 | Hattori et al. | | 2005/0082839 A1 | 4/2005 | McCoin |
| 6,911,741 B2 | 6/2005 | Pettersen et al. | | 2005/0230979 A1 | 10/2005 | Bywaters et al. |
| 6,921,243 B2 | 7/2005 | Canini et al. | | 2005/0280264 A1 | 12/2005 | Nagy |
| 6,931,834 B2 | 8/2005 | Jones | | 2006/0000269 A1 | 1/2006 | LeMieux et al. |
| 6,933,645 B1 | 8/2005 | Watson | | 2006/0001269 A1 | 1/2006 | Jansen et al. |
| 6,933,646 B2 | 8/2005 | Kinoshita | | 2006/0006658 A1 | 1/2006 | McCoin |
| 6,942,454 B2 | 9/2005 | Ohlmann | | 2006/0012182 A1 | 1/2006 | McCoin |
| 6,945,747 B1 | 9/2005 | Miller | | 2006/0028025 A1 | 2/2006 | Kikuchi et al. |
| 6,949,860 B2 | 9/2005 | Hama | | 2006/0066110 A1 | 3/2006 | Jansen |
| 6,951,443 B1 | 10/2005 | Blakemore | | 2006/0071575 A1 | 4/2006 | Jansen |
| 6,972,498 B2 | 12/2005 | Jamieson et al. | | 2006/0091735 A1 | 5/2006 | Song |
| 6,983,529 B2 | 1/2006 | Ortt et al. | | 2006/0125243 A1 | 6/2006 | Miller |
| 6,984,908 B2 | 1/2006 | Rinholm et al. | | 2006/0131985 A1 | 6/2006 | Qu |
| 6,987,342 B2 | 1/2006 | Hans | | 2006/0152012 A1 | 7/2006 | Wiegel et al. |
| 6,998,729 B1 | 2/2006 | Wobben | | 2006/0152015 A1 | 7/2006 | Bywaters et al. |
| 7,004,724 B2 | 2/2006 | Pierce et al. | | 2006/0152016 A1 | 7/2006 | Bywaters et al. |
| 7,008,172 B2 | 3/2006 | Selsam | | 2007/0020109 A1 | 1/2007 | Takahashi et al. |
| 7,008,348 B2 | 3/2006 | LaBath | | 2007/0116567 A1 | 5/2007 | Luetze |
| 7,016,006 B2 | 3/2006 | Song | | 2007/0187954 A1 | 8/2007 | Struve et al. |
| 7,021,905 B2 | 4/2006 | Torrey et al. | | 2007/0187956 A1 | 8/2007 | Wobben |
| 7,028,386 B2 | 4/2006 | Kato et al. | | 2007/0222226 A1 | 9/2007 | Casazza et al. |
| 7,033,139 B2 | 4/2006 | Wobben | | 2007/0222227 A1 | 9/2007 | Casazza et al. |
| 7,038,343 B2 | 5/2006 | Agnes et al. | | 2008/0107526 A1 | 5/2008 | Wobben |
| 7,042,109 B2 | 5/2006 | Gabrys | | 2008/0197636 A1 | 8/2008 | Tilscher et al. |
| 7,057,305 B2 | 6/2006 | Krüger-Gotzmann et al. | | 2008/0197638 A1 | 8/2008 | Wobben |
| 7,075,192 B2 | 7/2006 | Bywaters et al. | | 2008/0246224 A1 | 10/2008 | Pabst et al. |
| 7,081,696 B2 | 7/2006 | Ritchey | | 2008/0290664 A1 | 11/2008 | Kruger |
| 7,088,024 B2 | 8/2006 | Agnes et al. | | 2008/0303281 A1 | 12/2008 | Krueger |
| 7,091,642 B2 | 8/2006 | Agnes et al. | | 2008/0309189 A1 | 12/2008 | Pabst |
| 7,095,128 B2 | 8/2006 | Canini et al. | | 2008/0315594 A1 | 12/2008 | Casazza et al. |
| 7,098,552 B2 | 8/2006 | McCoin | | 2009/0096309 A1* | 4/2009 | Pabst et al. ............... 310/156.12 |
| 7,109,600 B1 | 9/2006 | Bywaters et al. | | 2010/0019502 A1 | 1/2010 | Pabst et al. |
| 7,111,668 B2 | 9/2006 | Rürup | | 2010/0026010 A1 | 2/2010 | Pabst |
| 7,116,006 B2 | 10/2006 | McCoin | | 2010/0117362 A1 | 5/2010 | Vihriala et al. |
| 7,119,469 B2 | 10/2006 | Ortt et al. | | 2010/0123318 A1 | 5/2010 | Casazza et al. |
| 7,154,191 B2 | 12/2006 | Jansen et al. | | | | |
| 7,161,260 B2 | 1/2007 | Krüger-Gotzmann et al. | | colspan FOREIGN PATENT DOCUMENTS | | |
| 7,166,942 B2 | 1/2007 | Yokota | | | | |
| 7,168,248 B2 | 1/2007 | Sakamoto | | CA | 2518742 | 9/2004 |
| 7,179,056 B2 | 2/2007 | Siegfriedsen | | CN | 1554867 | 12/2004 |
| 7,180,204 B2 | 2/2007 | Grant | | DE | 1130913 | 6/1962 |
| 7,183,665 B2 | 2/2007 | Bywaters et al. | | DE | 2164135 | 7/1973 |
| 7,196,446 B2 | 3/2007 | Hans | | DE | 2322458 | 11/1974 |
| 7,205,678 B2 | 4/2007 | Casazza | | DE | 2506160 | 8/1976 |
| 7,217,091 B2 | 5/2007 | LeMieux | | DE | 2922885 | 12/1980 |
| 7,259,472 B2 | 8/2007 | Miyake et al. | | DE | 3638129 | 5/1988 |
| 7,281,501 B2 | 10/2007 | Leufen | | DE | 3844505 | 7/1990 |
| 7,285,890 B2 * | 10/2007 | Jones et al. ............... 310/156.19 | | DE | 3903399 | 8/1990 |
| 7,323,792 B2 | 1/2008 | Sohn | | DE | 4304577 | 8/1994 |
| 7,345,376 B2 | 3/2008 | Costin | | DE | 4402184 | 8/1995 |
| 7,358,637 B2 | 4/2008 | Tapper | | DE | 4415570 | 11/1995 |
| 7,377,163 B2 | 5/2008 | Miyagawa | | DE | 4444757 | 6/1996 |
| 7,385,305 B2 | 6/2008 | Casazza | | DE | 29706980 | 7/1997 |
| 7,385,306 B2 | 6/2008 | Casazza | | DE | 19636591 | 3/1998 |
| 7,431,567 B1 | 10/2008 | Bevington et al. | | DE | 19644355 | 4/1998 |
| 7,443,066 B2 | 10/2008 | Salamah et al. | | DE | 19652673 | 6/1998 |
| 7,458,261 B2 | 12/2008 | Miyagawa | | DE | 19711869 | 9/1998 |
| 7,482,720 B2 | 1/2009 | Gordon et al. | | DE | 19748716 | 11/1998 |
| 7,548,008 B2 | 6/2009 | Jansen et al. | | DE | 29819391 | 2/1999 |
| | | | | DE | 19801803 | 4/1999 |

| | | | | | | |
|---|---|---|---|---|---|---|
| DE | 19932394 | 1/2001 | | JP | 6002970 | 1/1994 |
| DE | 19947915 | 4/2001 | | JP | 6269141 | 9/1994 |
| DE | 1 995 1594 | 5/2001 | | JP | 10-070858 | 3/1998 |
| DE | 19951594 | 5/2001 | | JP | 11236977 | 8/1999 |
| DE | 10000370 | 7/2001 | | JP | 11-299197 | 10/1999 |
| DE | 20102029 | 8/2001 | | JP | 2000-134885 | 5/2000 |
| DE | 1 021 9190 | 11/2003 | | JP | 2001-057750 | 2/2001 |
| DE | 10246690 | 4/2004 | | JP | 2003453072 | 7/2003 |
| DE | 102004018524 | 11/2005 | | JP | 2004-153913 | 5/2004 |
| DE | 102004028746 | 12/2005 | | JP | 2004-297947 | 10/2004 |
| EP | 0 013 157 | 7/1980 | | JP | 2005-006375 | 1/2005 |
| EP | 0232963 | 8/1987 | | JP | 2005-020906 | 1/2005 |
| EP | 0313392 | 4/1989 | | JP | 2005-312150 | 11/2005 |
| EP | 0 627 805 | 12/1994 | | NL | 8902534 | 5/1991 |
| EP | 1108888 | 6/2001 | | RU | 2000466 | 9/1993 |
| EP | 1167754 | 1/2002 | | RU | 2229621 | 5/2004 |
| EP | 1289097 | 3/2003 | | WO | WO8402382 | 6/1984 |
| EP | 1291521 | 3/2003 | | WO | 91/05953 | 2/1991 |
| EP | 1 309 067 | 5/2003 | | WO | WO9212343 | 7/1992 |
| EP | 1363019 | 11/2003 | | WO | WO9730504 | 8/1997 |
| EP | 1375913 | 1/2004 | | WO | WO9733357 | 9/1997 |
| EP | 1394406 | 3/2004 | | WO | WO9840627 | 9/1998 |
| EP | 1394451 | 3/2004 | | WO | WO9930031 | 6/1999 |
| EP | 1589222 | 10/2005 | | WO | WO9933165 | 7/1999 |
| EP | 1612415 | 1/2006 | | WO | WO9937912 | 7/1999 |
| EP | 1641102 | 3/2006 | | WO | WO9939426 | 8/1999 |
| EP | 1677002 | 7/2006 | | WO | WO0001056 | 1/2000 |
| EP | 1772624 | 4/2007 | | WO | 01/06623 | 1/2001 |
| EP | 1780409 | 5/2007 | | WO | WO0106121 | 1/2001 |
| EP | 1829762 | 9/2007 | | WO | WO0107784 | 2/2001 |
| ES | 2140301 | 2/2000 | | WO | WO0121956 | 3/2001 |
| FR | 806292 | 12/1936 | | WO | WO0125631 | 4/2001 |
| FR | 859844 | 12/1940 | | WO | WO0129413 | 4/2001 |
| FR | 1348765 | 1/1964 | | WO | WO0134973 | 5/2001 |
| FR | 2401091 | 3/1979 | | WO | WO0135517 | 5/2001 |
| FR | 2445053 | 7/1980 | | WO | WO0169754 | 9/2001 |
| FR | 2 519 483 | 7/1983 | | WO | WO0233254 | 4/2002 |
| FR | 2 594 272 | 8/1987 | | WO | WO02057624 | 7/2002 |
| FR | 2594272 | 8/1987 | | WO | WO02083523 | 10/2002 |
| FR | 2760492 | 9/1998 | | WO | WO03036084 | 5/2003 |
| FR | 2796671 | 1/2001 | | WO | WO03067081 | 8/2003 |
| FR | 2798168 | 3/2001 | | WO | WO03076801 | 9/2003 |
| FR | 2810374 | 12/2001 | | WO | WO2004017497 | 2/2004 |
| FR | 2882404 | 8/2006 | | WO | WO2005103489 | 11/2005 |
| GB | 191317268 | 0/1914 | | WO | WO2006013722 | 2/2006 |
| GB | 859 176 | 1/1961 | | WO | WO2006032515 | 3/2006 |
| GB | 1524477 | 9/1978 | | WO | WO2008078342 | 7/2008 |
| GB | 1537729 | 1/1979 | | | | |
| GB | 2041111 | 9/1980 | | | | |
| GB | 2 050 525 | 1/1981 | | | | |
| GB | 2 075 274 | 11/1981 | | | | |
| GB | 2 131 630 | 6/1984 | | | | |
| GB | 2144587 | 3/1985 | | | | |
| GB | 2208243 | 3/1989 | | | | |
| GB | 2266937 | 11/1993 | | | | |
| GB | 2372783 | 9/2002 | | | | |
| JP | 57059462 | 4/1982 | | | | |
| JP | 3145945 | 6/1991 | | | | |
| JP | 5122912 | 5/1993 | | | | |

OTHER PUBLICATIONS

Communication pursuant to Article 94(3) EPC12095302 from the EPO Examination Division regarding corresponding foreign application (EP 06 808 902), dated Oct. 6, 2008.

Maxime R. Dubois, Study of TFPM machines with toothed rotor applied to direct-drive generators for wind turbines, 2004.

Variable Speed Gearless Wind Turbine (website), http://www.mhi.cojp/msmw/mw/en/gearless.html, viewed on Sep. 22, 2006.

* cited by examiner

MAGNET HOLDER FOR PERMANENT MAGNET ROTORS OF ROTATING MACHINES

PRIORITY CLAIM

This application is a national stage application of PCT/IB2006/002684, filed Sep. 27, 2006, which claims the benefit of priority to Italian Application No. BZ2005A000062, filed Nov. 29, 2005, the entire contents of which are incorporated herein.

TECHNICAL FIELD

Embodiments disclosed herein relate to rotating machinery, such as wind turbines, rope driven and carried transport systems, electric generators and motors, and permanent magnet supports therefor. More particularly, embodiments relate to magnet holders in rotating machine rotors, such as rotors in wind turbines, wind mills, electric generators, electric motors, rope or cable based transport systems, and the like.

BACKGROUND

In power generating and working rotating machinery, such as wind machines and rope or cable driven and carried transport systems, relative motion between magnetic field generators and coils produces electricity, one of these groups being mounted on a rotor and the other group being mounted on a stator of the power generating machine. The magnetic field generators are typically windings, which are electromagnets supplied with a small portion of the output of the power generating machine. However, permanent magnets can instead be used to provide a magnetic field that induces electrical current in conductors when relative motion occurs between the magnets and the conductors. But permanent magnets are relatively heavy, and when used in large scale machinery, the apparatus used to hold the magnets in place can add substantially more undesirable weight, are difficult to install, are limited in the sizes of magnets they can accommodate, or are overly costly. For example, in some applications, the magnets are glued to a rotor body, the glue being applied under pressure. Additional applications use stampings over the ends of the magnets to hold them in place. Still other applications employ clamps, each clamp having an end attached to the underside of the rotor body and another end extending over the body of the magnet.

SUMMARY

Embodiments disclosed herein overcome the difficulties of prior art magnet supports, eliminating adhesive and stamping and rendering attachment to the rotor very simple. Additionally, the holder of the embodiments disclosed herein can accommodate multiple sizes of magnets and are easily and quickly assembled. In one embodiment, a pincer element holds the magnet or magnet assembly with two claws on one end of the holder. A flexible hinge member connects the pincer claws and forms a bridge that creates two seats. The first seat is that in which the magnet assembly is received. The other seat can receive a tightening section that forces the claws together when tightened, thus causing the claws to grip and retain the magnet assembly. On the outsides of the seat, the holder includes formations that enable one holder to be interlocked with adjacent holders. The coupling end, when the holder is not installed on the rotor and the tightening section is removed or at least loosened, can be used to open the pincer element, thereby opening the pincer claws to release or enable insertion of the magnet. Advantageously, the holder can be made from aluminum, such as an aluminum extrusion, to save weight and cost, though other materials could be used. Using a plurality of magnet holders of the type disclosed herein, a wind machine rotor can be built using permanent magnets, yet with relatively low weight, relatively low cost, and less complex assembly.

BRIEF DESCRIPTION OF THE DRAWINGS

Embodiments will be described while referring to the accompanying drawings.

DESCRIPTION

Figure 1:
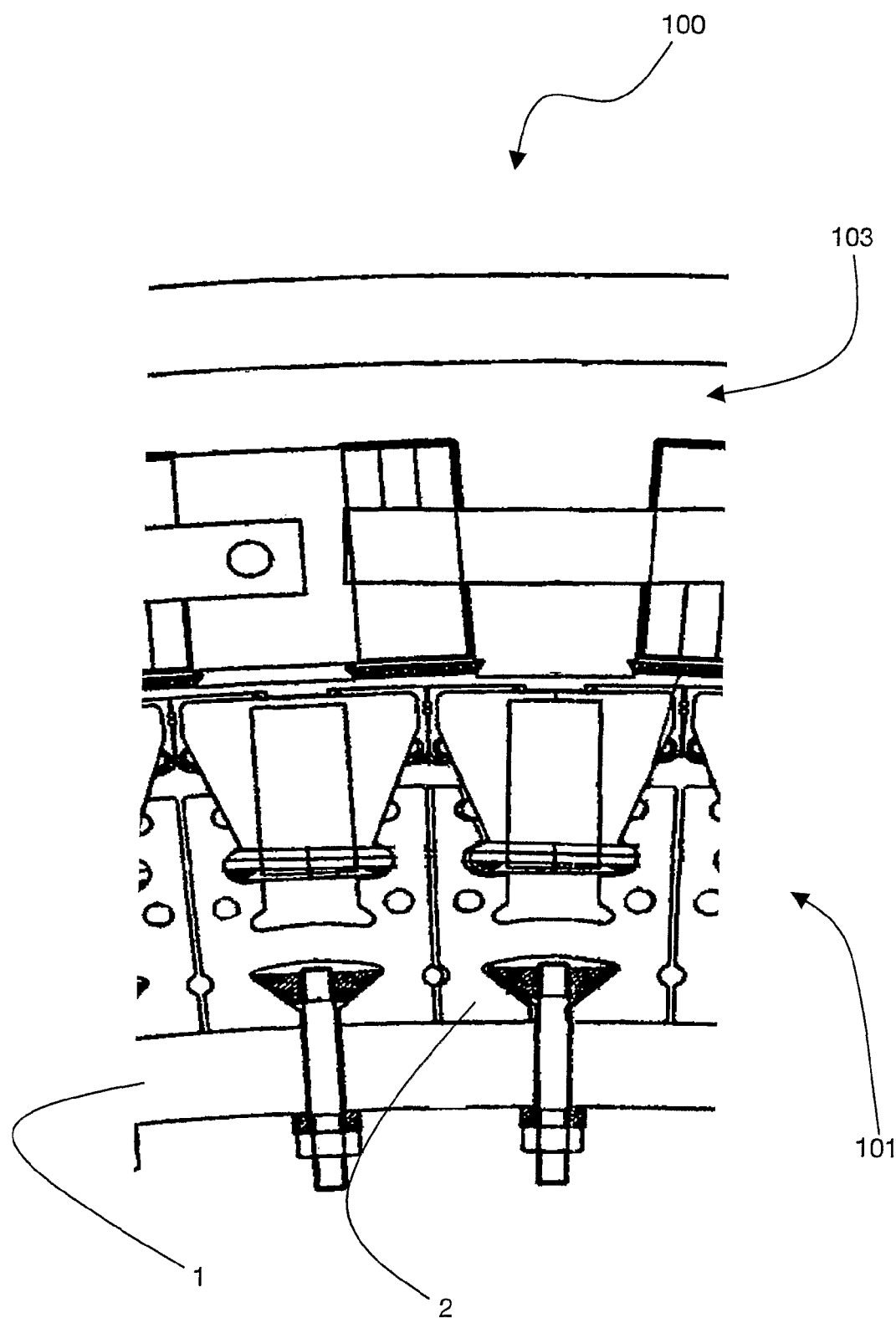
FIG. 1 shows a schematic cross section of a portion of a rotating machine, such as a wind turbine.
Figure 2:
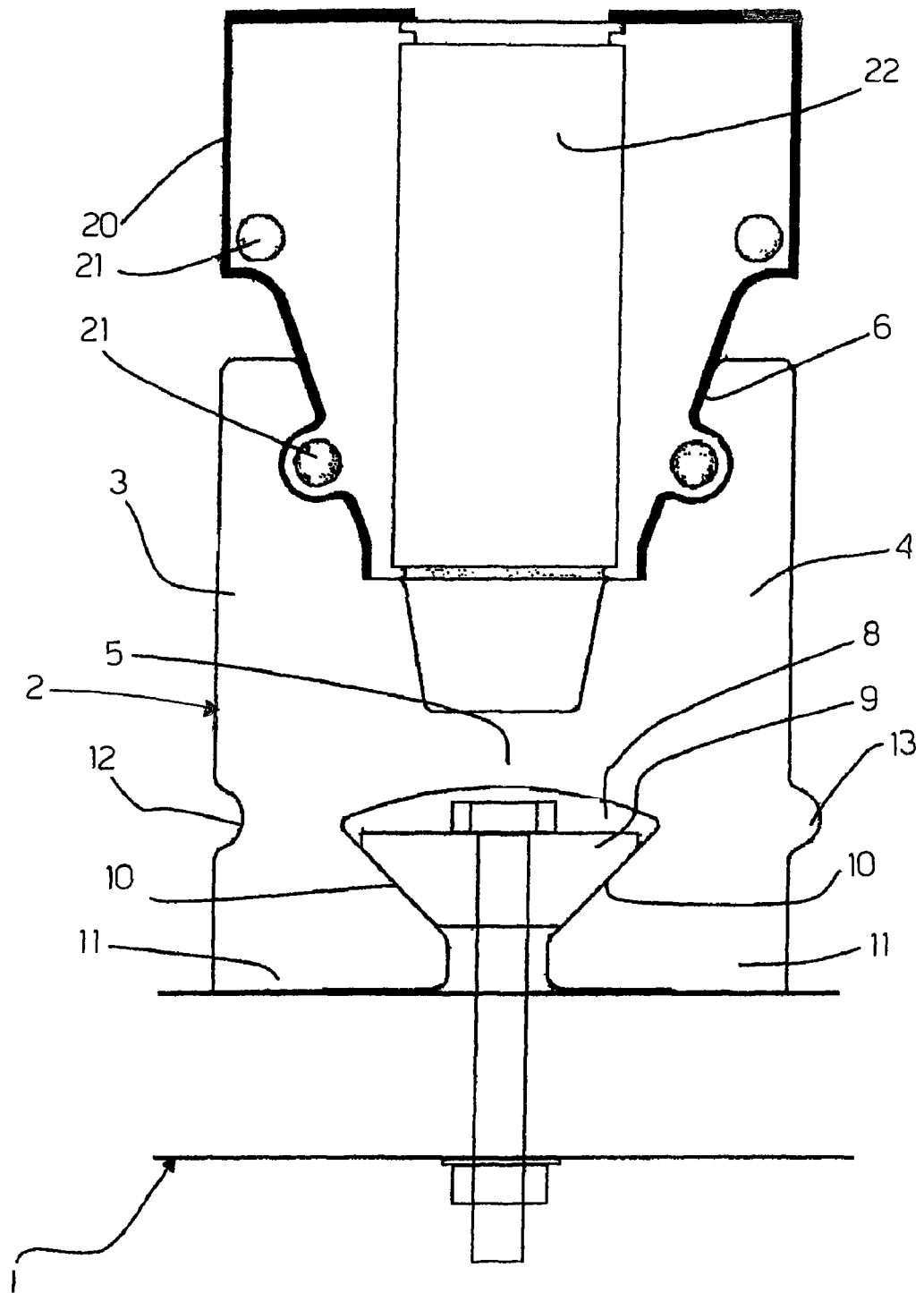
FIG. 2 shows a schematic partial section through a magnet holder according to embodiments disclosed herein with a magnet assembly and a tightening section installed.
Figure 3:
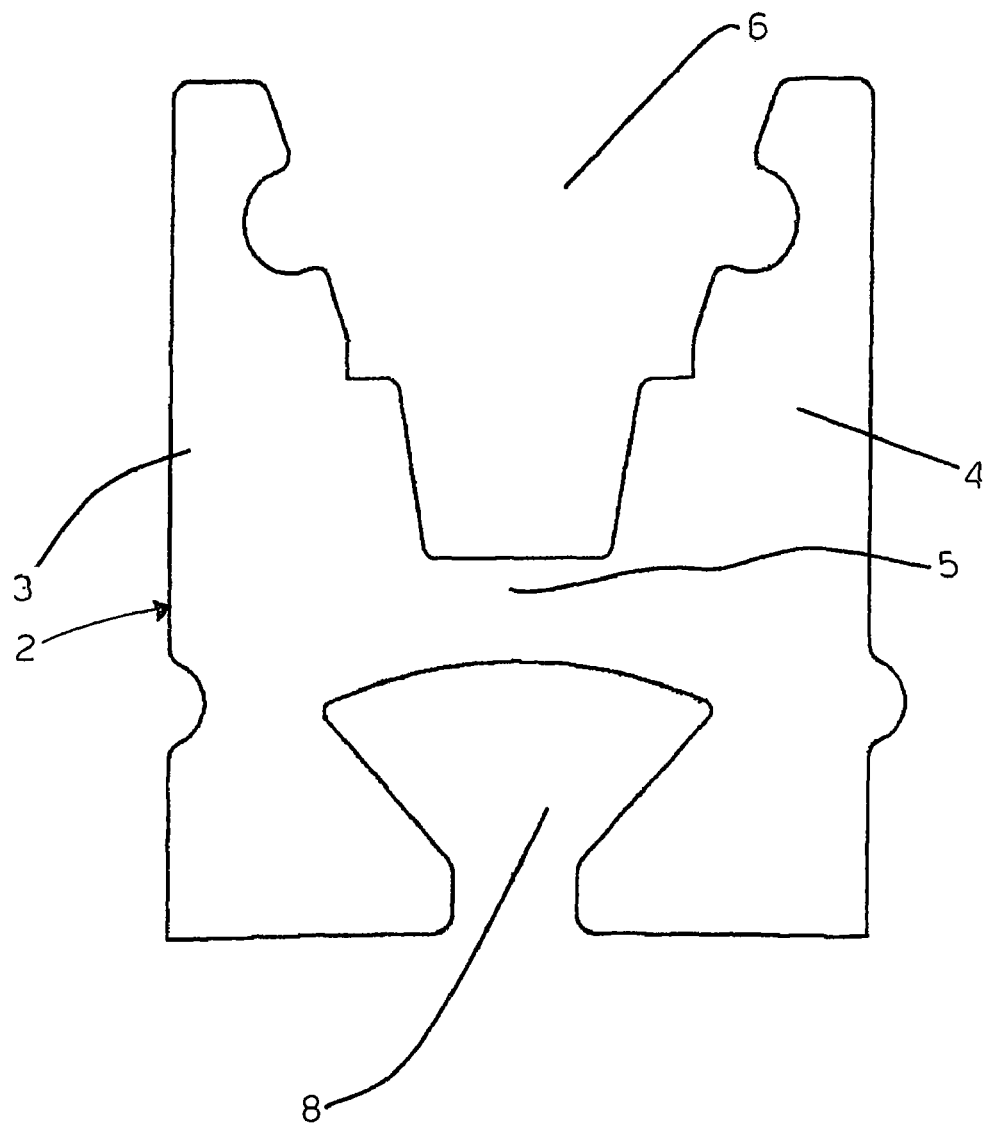
FIG. 3 shows a schematic partial section through a magnet holder according to embodiments disclosed herein with no magnet assembly or tightening section installed.

Referring to FIG. 1, in one embodiment, a rotating machine 100, such as a wind turbine, includes a rotor 101 supported via a bearing by a stator 103. The rotor 101 includes a rotor body 1 that supports a plurality of magnet holders 2, such as that seen in FIG. 1. In one embodiment, as seen in FIGS. 2 and 3, the preferred magnet holder 2 is a pincer element with two claws 3, 4 that are connected by a flexible bridge 5. The claws 3, 4 form a seat 6 that can receive a portion of a magnet assembly 20. An example of a suitable magnet assembly 20 is a core plate stack held together by tie rods 21 and holding a permanent magnet 22 as disclosed in copending PCT application PCT/IB/2006/002679, based on Italian Patent Application BZ2005A063.

In one embodiment, the claws 3, 4 extend beyond the bridge 5 to form another seat 8 that can receive a tightening section 9 that is used to force the claws 3, 4 against the magnet assembly 20 and to secure the magnet holder to the rotor body 1. More specifically, the seat 8 includes two inclined internal planes 10 of terminal expansions 11 of the claws 3, 4. The tightening section 9 has corresponding inclined external surfaces, such that when the tightening section 9 is drawn away from the magnet assembly 20, the terminal expansions 11 of the claws 3, 4 are forced apart, causing the claws 3, 4 to pivot about the bridge 5, which forces the seat 6 for the magnet assembly 20 to close. Thus, when the magnet assembly 20 is in the seat 6, the tightening section 9 is drawn away form the magnet assembly 20, as with a bolt extending through the tightening section 9 and into the rotor body 1, to secure the magnet assembly in the pincer element 2. Preferably, the tightening section 9 is drawn by a tightening member, such as a bolt.

It should be noted that in one embodiment, the pivoting of the claws 3, 4 is not done about a point per se, but is achieved by deformation of the claws and bridge. During this deformation, the bridge acts as a spring tending to return the claws to their original position. Thus, when the terminal expansions move together and apart, the bridge-claw junctions and the bridge itself deform, yielding the pivoting action. Preferably, the holder 2 is formed as an aluminum extrusion, though other materials or machined aluminum could be used if desired.

In one embodiment, the rotor body 1 will have a plurality of magnet holders 2 mounted thereon to form the complete rotor. To even better secure the magnet holders 2 on the rotor body 1, each magnet holder 2 preferably includes a recess 12 and corresponding projection 13 on opposite sides of the magnet holder 2. When mounted on the rotor body 1, the projection 13 of a magnet holder 2 will be received by the recess 12 of an adjacent magnet holder, while the recess 12 receives the projection 13 of an adjacent magnet holder 2 on the opposite side. In different embodiments, the magnet holders 2 are preferably formed from aluminum by extrusion, though other materials and methods could be employed.

The embodiments disclosed herein thus provide a simple, relatively inexpensive permanent magnet rotor for electricity producing wind machines. To place a magnet assembly 20 in a magnet holder 2, the terminal expansions 11 of the claws 3, 4 are preferably placed in a press or the like, which squeezes the terminal expansions together. The other ends of the claws 3, 4 are forced apart by the action of the press since the claws 3, 4 pivot about the bridge 5. With the claws 3, 4 thus open, a magnet assembly can be inserted in the seat 6, and the terminal expansions 11 can be released to allow the claws 3, 4 to close on the magnet assembly 20. The tightening section 9 can then be inserted into the other seat 8, the holder 2 placed on the rotor body 1, and a bolt or the like inserted through the rotor body 1 and into the tightening section 9. As the tightening section 9 is drawn toward the rotor body 1 to secure the holder 2 against the rotor body 1, the tightening section 9 applies expansive force to the planes 10 of the terminal expansions 11, which results in compressive force being applied to the magnet assembly 20 by the other ends of the claws 3, 4, thus securing the magnet assembly while attaching the holder to the rotor body 1.

While the rotor body 1 of the different embodiments disclosed herein has been described in the context of an electrical generator, specifically a wind-powered electrical generator, it should be noted that different embodiments could be applied as the rotor body of an electric motor. Additionally, if the rotor body were linearized, different embodiments could be employed in a linear electric motor or generator without departing from the spirit of the invention.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A rotating machine comprising:
    a stator;
    a rotor with a rotor body;
    a plurality of magnet holders mounted on the rotor body, the magnet holders receiving a plurality of magnet assemblies, each magnet holder including:
        two opposed claws connected by a bridge;
        a first seat formed on one side of the bridge by the claws;
        a second seat formed on another side of the bridge by a plurality of terminal expansions of the claws; and
        a tightening section configured to apply expansive force to the terminal expansions when the tightening section is drawn away from the bridge, the expansive force causing the claws to pivot about the bridge and apply compressive force at opposite ends of the claws from their terminal expansion ends.

2. The rotating machine of claim 1, wherein for each magnet holder, the second seat includes a plurality of facing inclined planes formed on the inner surfaces of the terminal expansions and the tightening section includes a plurality of corresponding inclined surfaces.

3. The rotating machine of claim 1, wherein for each magnet holder, one of the terminal expansions includes a projection on an outer surface of said terminal expansion and the other terminal expansion includes a corresponding recess on an outer surface of said terminal expansion such that the projection extends into the recess of a claw of a next magnet holder and the recess receives the projection of a claw of a previous magnet holder.

4. The rotating machine of claim 1, wherein for each magnet holder, the tightening section receives a bolt extending through the rotor body and attaches a die magnet holder to the rotor body while acting on the terminal expansions to force the opposite ends of the claws toward each other.

5. The rotating machine of claim 1, wherein each magnet holder is an aluminum extrusion.

6. The rotating machine of claim 1, wherein each magnet holder is formed from a plastic.

7. A method of attaching magnet holders to a rotor body of a wind turbine including a stator, a rotor with the rotor body, and a magnet assembly, said method of attaching the magnet holder comprising:
    placing a plurality of terminal expansions of two opposed claws of said magnet holder in a press, said two opposed claws connected by a bridge, wherein a first seat is formed on one side of the bridge by the claws, and a second seat is formed on another side of the bridge by the plurality of terminal expansions of the claws; and
    squeezing the terminal expansions toward each other with the press to cause the claws to pivot about the bridge, thereby opening the opposite ends of the claws for insertion of the magnet assembly of the wind turbine into the first seat.

8. The method of claim 7, further comprising:
    inserting the magnet assembly into the first seat, and
    releasing the press to allow the opposite ends of the claws to close on the magnet assembly.

9. The method of claim 7, comprising:
    inserting a tightening section into the magnet holder,
    placing the magnet holder on the rotor body,
    inserting a bolt through the rotor body and through the tightening section to secure the magnet holder to the rotor body, and
    drawing the tightening section toward the rotor body to apply an expansive force to at least one of the terminal expansions of the claws, said expansive force causing the claws to pivot about the bridge to apply a compressive force at the ends of the claws opposite from the terminal expansions.

10. A rotating machine permanent magnet rotor comprising:
    a plurality of permanent magnet assemblies supported in a plurality of respective magnet holders, each magnet holder including:
        a pincer element with two claws joined by a bridge,
        first ends of the claws forming a first seat on one side of the bridge and engaging a magnet assembly, and
        second ends of the claws including a plurality of terminal expansions of the claws forming a second seat receiving a tightening section.

11. The rotating machine permanent magnet rotor of claim 10, wherein the second seat comprises a plurality of facing inclined planes on inner surfaces of the terminal expansions and the tightening section includes a plurality of corresponding inclined faces such that when the tightening section is drawn toward the rotor body, the inclined faces of the tightening section tend to force the inclined planes of the terminal expansions apart, thereby causing the claws to pivot about the bridge and tending to open the first ends of the claws.

12. The rotating machine permanent magnet rotor of claim 10, wherein the magnet holder is an aluminum extrusion.

13. The rotating machine permanent magnet rotor of claim 10 wherein a plurality of outer surfaces of the claws carry a plurality of securers that interlock with a plurality of corresponding securers on adjacent magnet holders.

14. The rotating machine permanent magnet rotor of claim 13, wherein the interlocking securers comprise a projection on an external surface of one claw and a recess on an external surface of the other claw, the recess corresponding to the projection so that the projection of another magnet holder claw can be received in the recess and the recess of another magnet holder claw can receive the projection.

15. A rotating machine magnet holder, comprising:
two opposed claws connected by a bridge;
a plurality of first portions of the claws on one side of the bridge;
a plurality of terminal expansions of the claws on another side of the bridge;
a first seat formed by the first portions;
a second seat formed by a plurality of inclined planes on a plurality of inner surfaces of the terminal expansions;
a tightening section including a plurality of inclined surfaces corresponding to and engaging the terminal expansion inclined planes; and
a tightening member connected to the tightening section from a rotor body of a rotating machine;
whereby when the tightening section is drawn away from the bridge by the tightening member, the surfaces interact to apply expansive force to the terminal expansions, the expansive force causing the claws to pivot about the bridge and apply compressive force at ends of the first portions of the claws.

* * * * *